(12) United States Patent
Johnson et al.

(10) Patent No.: US 8,245,051 B2
(45) Date of Patent: Aug. 14, 2012

(54) EXTENSIBLE ACCOUNT AUTHENTICATION SYSTEM

(75) Inventors: Ryan D. Johnson, Bothell, WA (US); Donald E. Schmidt, Redmond, WA (US); Jeffrey F. Spelman, Woodinville, WA (US); Kahren Tevosyan, Kirkland, WA (US); Vijayavani Nori, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 11/129,711

(22) Filed: May 13, 2005

(65) Prior Publication Data

US 2006/0259776 A1  Nov. 16, 2006

(51) Int. Cl.
  *H04L 29/06* (2006.01)
(52) U.S. Cl. .......... 713/185; 713/168; 713/172; 726/17; 726/20
(58) Field of Classification Search .................. 713/168, 713/172, 185; 726/17, 20
  See application file for complete search history.

(56) References Cited

U.S. PATENT DOCUMENTS

| | | | |
|---|---|---|---|
| 6,144,959 A | 11/2000 | Anderson et al. | |
| 6,292,904 B1 | 9/2001 | Broomhall et al. | |
| 7,350,229 B1 * | 3/2008 | Lander | 726/8 |
| 7,359,884 B2 * | 4/2008 | Ta et al. | 705/59 |
| 2003/0079032 A1 * | 4/2003 | Orsolits et al. | 709/230 |
| 2003/0144869 A1 | 7/2003 | Fung et al. | |
| 2004/0123138 A1 | 6/2004 | Le Saint | |
| 2004/0128506 A1 * | 7/2004 | Blakley et al. | 713/170 |
| 2004/0128516 A1 | 7/2004 | Okamoto et al. | |
| 2004/0230529 A1 * | 11/2004 | Tieu et al. | 705/51 |
| 2005/0278347 A1 * | 12/2005 | Wolf et al. | 707/100 |
| 2006/0020679 A1 * | 1/2006 | Hinton et al. | 709/217 |

FOREIGN PATENT DOCUMENTS

WO  WO0011865  3/2000

OTHER PUBLICATIONS

ASAS Overview; http://www.authenex.com/products_asas.cfm.

* cited by examiner

*Primary Examiner* — Brandon Hoffman
*Assistant Examiner* — Michael D Anderson
(74) *Attorney, Agent, or Firm* — L. Alan Collins; Collins & Collins Intellectual, LLC

(57) ABSTRACT

Systems and methods directed at enhancing the capability of a federated authentication system by configuring the system with extensibility points for adding new account stores and customizing claim transformations. The federated authentication system includes accounts stores, a security token service (STS), and custom claim transformation modules. The account stores are configured to maintain data associated with accounts and to provide security claims in an intermediate format. The STS is configured to retrieve the security claims provided by the account stores and includes built-in transformations for transforming each security claim from the intermediate format to formats associated with resource providers. The STS is further configured to provide extensibility points for custom claim transformations that are not available from the built-in transformations. The custom claim transformation modules are configured to perform at least one custom claim transformation. Each custom claim transformation module is further configured to interact with the STS through at least one of the extensibility points. The STS may be configured to provide extensibility points for interacting with account stores that the STS does not explicitly recognize.

18 Claims, 8 Drawing Sheets

EXTENSIBLE ACCOUNT AUTHENTICATION SYSTEM

BACKGROUND

In recent years, the Internet has become one of the most important tools for organizations to communicate and interact with each other. For security reasons, a user in a particular organization often has to be authenticated before being granted access to resources in another organization. Different mechanisms have been developed to facilitate user authentication. One such mechanism is Web Services (WS)-Federation. WS-Federation enables the sharing of identity across enterprise boundaries using Extensible Markup Language (XML) security tokens. These XML tokens utilize formats, such as Security Assertion Markup Language (SAML) or Extensible Rights Markup Language (XrML), and contain rich authorization claims in addition to identity data. For example, under WS-Federation, a security token associated with an account may assert not just the account's identity (e.g. in the form of an email address) but also date of birth, group affiliations, or the like.

Typically, the claims in the security tokens flow between a pair of enterprises. The originator of the tokens is called the Identity Provider. The Identity Provider owns a user's identity and authentication. The consumer of the tokens is called the Resource Provider. The Resource Provider may provide any number of Web Services or other applications. A cryptographic trust may be established between the two parties (for example, the Identity Provider shares his X509 certificate with the Resource Provider) so that the Resource Provider can authenticate the Identity Provider as the authority for security tokens.

In WS-Federation, the Identity Provider typically deploys a server that hosts a Security Token Service (STS). An Identity Provider's STS is generally referred to as STS-IP. The STS-IP authenticates users based on legacy credentials (e.g. username and password) and issues a WS-Federation security token, which will be accepted by the Resource Provider.

Under WS-Federation, it is possible for web services or other applications to have explicit trust with each partner's STS-IP. However, in order to simplify the administration of trust, the Resource Provider generally deploys its own STS, which may be referred to as STS-RP. Individual applications typically trust the STS-RP and a single trust generally exists between STS-RP and STS-IP, which embodies the business level agreement between the two parties. In this manner, each application may be ignorant of the many different Identity Providers.

Although WS-Federation is an effective way to establish trust between two systems, the relationships may become difficult to manage when the systems increase in complexity. Specifically, if a Resource Provider deploys multiple applications, these applications may not all expect security claims in the same format. For example, one application may expect the user's date of birth while another may expect the user's age. Similarly, difficulties may arise if each partner Identity Provider provides claims in different incompatible formats. For this reason, it is often necessary for the STS-RP to perform transformation from the claim format of an Identity Provider to the claim format required by an application.

A system in WS-Federation may be configured to handle account stores and transformations that are anticipated when the system was first created. However, it is often difficult for an existing system to be reconfigured to add new types of account stores or to add customized claim transformations. An effective solution for providing extensibility to systems in WS-Federation without undue complexity continues to elude those skilled in the art.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

A federated authentication system using an intermediate format is capable of handling claim transformation without undue complexity. The federated authentication system includes an identity provider and a resource provider. The identity provider receives a request for information from the resource provider to authenticate an account for an application associated with the resource provider. Security claims associated with the account are retrieved where the security claims are provided by an account store. Each security claim is transformed from an intermediate format to a federated format recognized by the resource provider. The transformed security claims are provided in a security token to the resource provider. A similar transformation process using intermediate claims can also be implemented by the resource provider to transform security claims provided by an identity provider from a federated format to formats recognized by the applications.

The systems and methods described herein further enhance the capability of a federated authentication system by configuring the system with extensibility points for adding new account stores and customizing claim transformations. The federated authentication system includes account stores, a security token service (STS), and custom claim transformation modules. The account stores are configured to maintain data associated with accounts and to provide security claims in an intermediate format. The STS is configured to retrieve the security claims provided by the account stores and includes built-in transformations for transforming each security claim from the intermediate format to formats associated with resource providers. The STS is further configured to provide extensibility points for custom claim transformations that are not available from the built-in transformations. The custom claim transformation modules are configured to perform at least one custom claim transformation. Each custom claim transformation module is further configured to interact with the STS through at least one of the extensibility points. The STS may be configured to provide extensibility points for interacting with account stores that the STS does not explicitly recognize.

Figure 1:
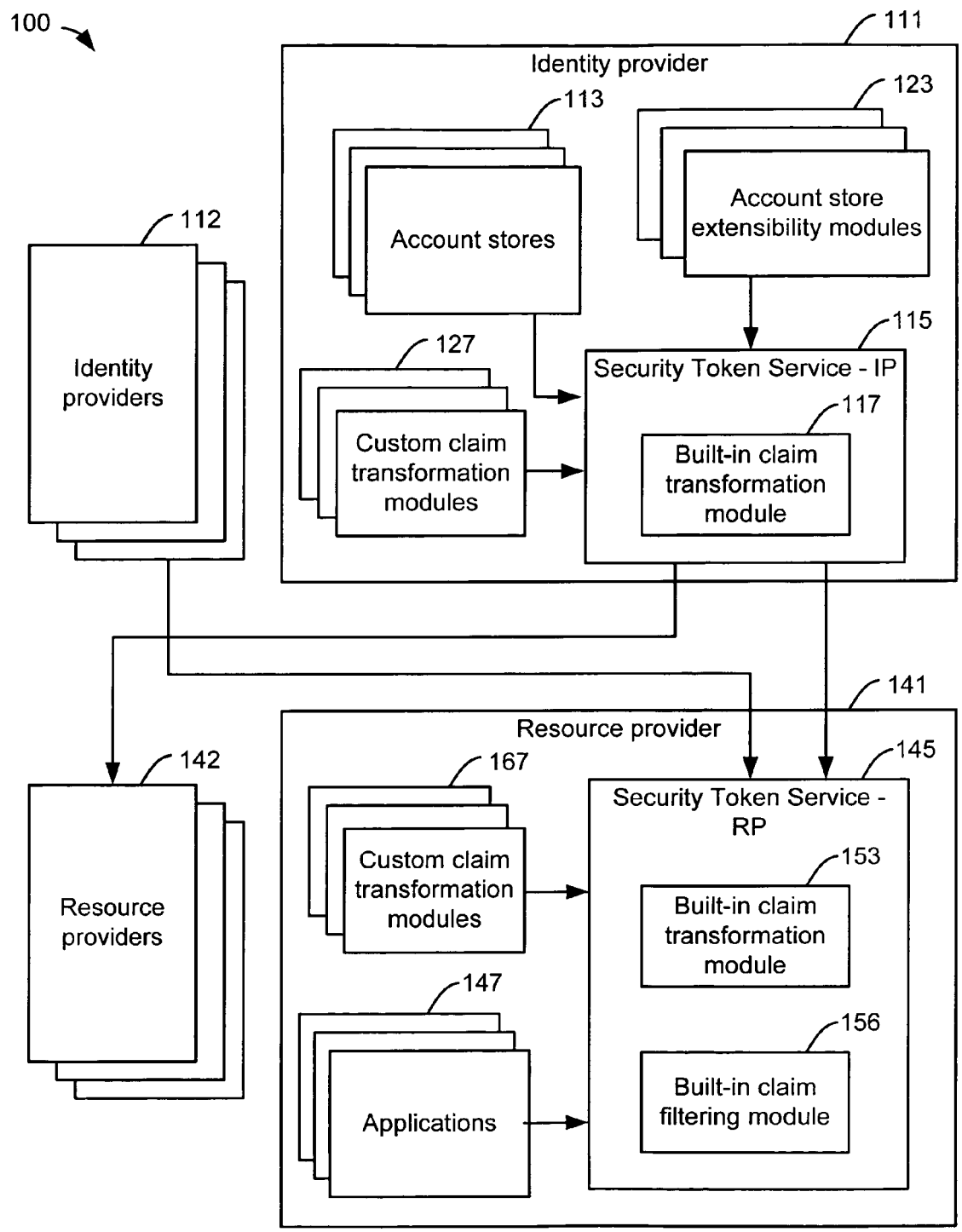
FIG. 1 shows an example system for managing authentication information with extensibility points.

FIG. 1 shows an example system 100 for managing authentication information with extensibility points. System 100 transforms claims in a federated identity management environment using intermediate claims. System 100 may implement a Web Services (WS) Federation. For example, system 100 may be a WS-Federation system configured to provide Web Single Sign-On (WebSSO) functionalities. System 100 typically includes multiple identity providers 111-112 and resource providers 141-142. Each of the identity providers 111-112 may include a security token service (STS-IP) and each of the resource providers 141-142 may include a security token service (STS-RP). For illustration purposes, only the example components for identity provider 111 and resource provider 141 are shown.

Identity providers 111-112 are configured to provide information for authenticating accounts (e.g. users) associated with identity providers 111-112. For example, a particular identity provider 111 may be a component in a corporate infrastructure for providing authentication information about employees to other organizations that provides services to those employees. As shown in FIG. 1, identity provider 111 may include account stores 113 and STS-IP 115. To provide extensibility, identity provider 111 may also include account store extensibility modules 123 and custom claim transformation modules 127.

Account stores 113 are components that manage data about users. For example, account stores 113 may include Active Directory (AD), Active Directory Application Mode (ADAM), Structured Query Language (SQL) systems, or the like. The data may include security information associated with the users, such as identity information. The security information typically corresponds to accounts associated with the users. Each of the account stores 113 is configured to provide the security information to security token service 115.

Security information may include any type of information associated with security. For example, a consumer related account store may provide security information that includes name, email address, social security number, date of birth, or the like. The security information provided by an information technology (IT) related account store may include user group membership, access control, user name, password, or the like. A military related account store may provide security information that includes security level, branch of service, security clearance, weapons training, deployment and reserve status, division, rank, or the like.

Typically, the security information provided by account stores 113 is organized in the form of claims. The security information may be in a format that is unique to the account store. Account stores 113 may be configured to provide the security claims in an intermediate format that can be processed by STS-IP 115. The intermediate format is used in an intermediate step to provide claims from account stores 113 in a transitional format that is not associated to any resource provider.

STS-IP 115 is configured to provide security tokens to multiple resource providers. As shown in FIG. 1, a particular resource provider 141 may request a user to be authenticated by information from identity provider 111 before the user is granted access to resources. STS-IP 115 is configured to provide security information about the user in the form of a security token to resource providers 141-142. STS-IP 115 is configured to receive the security information in the form of claims from account stores 113. The claims from account stores 113 are typically in an intermediate format. STS-IP 115 is configured to interact with account stores 113, which are explicitly recognized by STS 115.

To provide growth capabilities, STS-IP 115 is also configured to interact with other account stores through extensibility points. Particularly, STS-IP 115 is configured to enable interactions with account store extensibility modules 123 through an interface. Account store extensibility modules 123 extend the available account stores that STS-IP 115 may use. In addition, account store extensibility modules 123 may be used to extend the client authentication methods that may be used to originally authenticate a client. For example, account store extensibility modules 123 allow STS-IP 115 to populate claims from an account store not explicitly understood by STS-IP 115 out of the box. Account store extensibility modules 123 may implement interfaces for interacting with STS-IP. An example interface is shown below:

```
public interface IAccountStore
{
    //
    // This property returns the type of the store,
    // for example "SQL". It is used for audit purposes.
    //
    string AccountStoreType {get;}
        //
        // This property returns the URI that uniquely
        // identifies this instance of the store type.
        //
        Uri AccountStoreUri {get;}
        //
        // This method authenticates a user and returns claims
        // for that user.
        //
        // credentialInfo - specifies the client credential info
        //
        // cc - returns claim context for the authenticated
        user
        //
        // userValidationInfo - returns the result of user
        validation
        //
        // authoritative - indicates that the store handled the
        logon
        //     authoritatively so that no other store needs to be
        tried
        //     to logon the user. Typically this will be true if the
        store
        //     found the user account.
        //
        // audit - returns a string that is audited locally on
        Federation
        // Service
        // The method returns true if the user credentials have
        been
        // successfully validated and false otherwise.
        //
        bool GetClaimsForUser(ClientCredentialInfo
        credentialInfo,
            ClaimContext cc,
            out UserValidationInfo userValidationInfo,
            out bool authoritative,
            out string audit);
}
```

An example account store extensibility module that may be built to support an account store that is not supported by STS-IP 115 out of the box is a module to support a SQL server based client account store. The module may be configured to pass client credentials, for example a username and password, and lookup the record in the database associated with a client. If such a record is found, the module may be configured to verify that the password passed to the module matches the password in the client record. When the password is authenticated, claims may be populated by fields from the database record. The claims are then passed to STS-IP 115, which would build a token using these claims.

Another example account store extensibility module is a module to support client authentication with a fingerprint. The module may be configured to pass the username and the fingerprint data as client credentials. The module may verify that the passed fingerprint matches the stored fingerprint for the specified username, which may be performed by going to a backend database. When the fingerprint is authenticated, the module may use LDAP to retrieve claims for the specified user account. The user account may be specified by the passed username. The claims may be passed out to STS-IP 115 and be incorporated into a token.

STS-IP 115 is configured to perform transformation to obtain claims in federated formats that are recognized by resource providers 141-142. As shown in FIG. 1, STS-IP 115 may include built-in claim transformation module 117 to perform the transformation. Built-in claim transformation module 117 is configured to transform security claims provided by account stores 113. Each resource provider typically accepts claims in a format specific to the resource provider. Built-in claim transformation module 117 is configured to transform intermediate claims provided by account stores 113 to a federated format recognized by STS-RP 145. Claims in the intermediate format and claims in the federated format contain semantically the same information and, thus, no significant content is lost by the transformation.

To perform the transformations, built-in claim transformation module 117 is configured to maintain transformation rules associated with resource providers for transforming claims from the intermediate format to the formats associated with resource providers 141-142. Built-in claim transformation module 117 is configured to perform claim transformations that were built into STS-IP 115 when out of the box. To extend to other transformations, STS-IP 115 is configured with extensibility points, which will be discussed below.

Resource providers 141-142 are configured to provide various kinds of services to users. For example, a particular resource provider 141 in FIG. 1 may be a component in an organization that provides many kinds of services. Resource provider 141 may also be included in an infrastructure that includes one or more organizations for providing a consolidated service solution. Resource providers 141-142 may require that the users be authenticated prior to providing access to the services. Each of the resource providers 141-142 may include a STS-RP to handle information related to account authentication. As shown in FIG. 1, example resource provider 141 includes STS-RP 145.

STS-RP 145 is configured to receive security tokens with claims provided by identity provider 111. Typically, each claim is associated with a user or an account that requests access to one of the applications 147 associated with resource provider 141. The claims received from identity provider 111 are generally in a federated format that is not readily usable by applications 147. STS-RP 145 is configured to transform the federated claims to other formats for applications 147. In this example, STS-RP 145 includes built-in claim transformation module 153 configured to transform the federated claims and built-in claim filtering module 156 configured to filter out claims that are not needed by an application.

Built-in claim transformation module 153 is configured to transform federated claims received from identity provider 111 to claims that are usable by applications 147. Applications 147 can include any type of computer executable components for providing functionalities, such as web services. Built-in claim transformation module 141 typically receives claims that are in a federated format that cannot be used by applications 147. Built-in claim transformation module 153 is configured to transform each received claim from the federated format to an intermediate format. Built-in claim transformation module 153 is also configured to transform the claim in the intermediate format to a format recognized by one or more of applications 147 to which the claim is destined. To perform the transformations, built-in claim transformation module 153 is configured to maintain transformation rules associated with each of the applications 147. The rules are used to transform the claims from the intermediate format to the application specific formats.

Both built-in claim transformation module 153 and built-in claim filtering module 156 are configured to handle claim transformations and filtering that were built into STS-RP 145 out of the box. To extend to other transformations, STS-IP 145 is configured with extensibility points, which will be discussed below.

In one example implementation, system 100 may be implemented as part of Active Directory Federation Services (ADFS). STS-IP 115 and STS-RP 145 may be implemented as Federation Services (FS). The components in example system 100 are shown in FIG. 1 for illustrative purpose. Actual implementation may include more, less or different components that provide similar functionalities as discussed above. Also, example system 100 is illustrated in FIG. 1 as a federated authentication system. A non-federated system may also implement the two-step security claim transformation technique with intermediate claims, as discussed above. For example, a non-federated system may include a security token service (STS) that serves both account stores and applications. In this system, the STS may transform claims from an account store specific format to an intermediate format, and then from the intermediate format to an application-specific format.

As discussed above, STS-IP 115 includes built-in claim transformation module 117 and STS-RP 145 includes built-in claim transformation module 153 and built-in claim filtering module 156. These modules are configured to handle transformations and filtering that were built into STS-IP 115 and STS-RP 145, respectively. To provide extensibility, both STS-IP 115 and STS-RP 145 are configured with extensibility points to perform other transformations and filtering. Particularly, STS-IP 115 includes an interface for communicating with custom claim transformation modules 127 configured to perform transformations that are not explicitly understood by STS-IP 115. Similarly, STS-RP 145 includes an interface for interacting with custom claim transformation modules 167, which may be configured to transform or filter claims.

Custom claim transformation modules 127 and 167 extend how claim transformations are handled by STS-IP 115 and STS-RP 145. Custom claim transformation modules 127 and 167 allow a customer or a third party to extend claim transformations and write code to implement new transformations, which may change, add or delete claims. Custom claim transformation modules 127 and 167 may also be configured to retrieve information from a database and transform the claims based on the information.

Typically, custom claim transformation modules 127 and 167 are registered per policy. Custom claim transformation modules 127 and 167 may be configured to support pipelining of claim transformations. The pipelining of claim transformations allows multiple claim transformation modules, possibly written by different entities, to be used together in conjunction to transform a claim. Custom claim transformation modules 127 and 167 may also be used in conjunction with the claim transformation modules that are built the STS, such as built-in claim transformation module 117, built-in claim transformation module 153 and built-in claim filtering module 156. The integration of the custom claim transformation modules and the built-in claim transformations is accomplished by calling the custom claim transformation modules multiple times before and after the built-in claim transformations are performed.

Tables 1-4 below show when in the claim transformation process the custom claim transformation modules can be called in relation to the built-in claim transformation and filtering modules. The top row of each table is the first transformation step and the bottom row of the table is the final transformation step. The outgoing claims in the final transformation step represent what will be sent in the token returned to the client. In each step, some but not all of the claim collections may change. Change is indicated in the table by the version number of the claims in each step. The claims are not shown in the row when they will have no affect on further transformation steps. The claim transformation module may be called twice for each scenario, allowing a pre-processing stage and a post-processing stage.

TABLE 1

|  | Incoming claims | Intermediate claims | Outgoing claims |
|---|---|---|---|
| Account store |  | B1 |  |
| Custom claim transformation module |  | B2 | C1 |
| Built-in claim transformation module |  | B2 | C2 |
| Custom claim transformation module |  | B2 | C3 |

Table 1 shows example claim transformation steps for an identity provider to provide security claims to a resource provider. The steps illustrative in Table 1 applies when credentials are authenticated by an account store as well as when an accelerator token is used to authenticate.

As shown in Table 1, in response to a request to provide security information associated with an account, the account store provides intermediate security claims, which are represented as version B1. One or more custom claim transformation modules may be configured to operate on the claims. In this example, a custom claim transformation module is configured to perform pre-processing on the claims. The custom claim transformation module transforms the intermediate claims B1 to B2. The custom claim transformation module is configured to transform intermediate claims B2 to include more, less or different claims than intermediate claims B1. The custom claim transformation module may also add outgoing claims C1.

After pre-processing by the custom claim transformation module, built-in claim transformation module may be called next to operate on the claims. In the example, the built-in claim transformation module transforms the outgoing claims from C1 to C2. The custom claim transformation module is then called for post-processing. The custom claim transformation module may be the same or a different module than the one called to perform the pre-processing. The outgoing claims are transformed by the custom claim transformation module from C2 to C3. Outgoing claims C3 are typically in a federated format and are provided to a resource provider.

Table 1 illustrates that custom claim transformation modules may be used in conjunction with the built-in claim transformation module to perform the transformation steps. Also, although only one custom transformation is shown, multiple modules may be called in sequence to obtain the desired transformations. This versatility enables custom claim transformation modules to take advantage of the transformations that are built into the STS.

TABLE 2

|  | Incoming claims | Intermediate claims | Outgoing claims |
|---|---|---|---|
| Incoming from STS-IP | A1 |  |  |
| Custom claim transformation module | A2 | B1 | C1 |
| Built-in claim transformation module |  | B2 | C1 |
| Built-in claim filtering for the application |  | B2 | C2 |
| Custom claim transformation module |  | B3 | C3 |

Table 2 illustrates an example of claim transformation steps for an STS-RP to process security claims provided by an STS-IP to an application. Incoming claims is received as A1. In response, a custom claim transformation module transforms the incoming claims from A1 to A2. The custom claim transformation module also adds intermediate claims B1 and outgoing claims C1. A built-in claim transformation module is then called to transform intermediate claims B1 to B2. A built-in claim filtering module is called to filter out claims that are not needed for the application. The built-in claim filtering module transforms the outgoing claims from C2 to C3. The custom claim transformation module is called to transform the intermediate claims from B2 to B3 and the outgoing claims from C2 to C3. Intermediate claims B3 may be persisted in a cookie for repeated authentication for the same account associated with the claims. C3 is provided to the application.

TABLE 3

|  | Incoming claims | Intermediate claims | Outgoing claims |
|---|---|---|---|
| Incoming from a cookie |  | B1 |  |
| Custom claim transformation module |  | B2 | C1 |
| Built-in claim filtering module |  | B2 | C2 |
| Custom claim transformation module |  | B3 | C3 |

Table 3 illustrates another example of claim transformation steps for an STS-RP to process security claims to an application. As shown in Table 3, the starting claims are obtained from a cookie, rather than being received from an STS-IP. Thus, there are no initial incoming claims.

TABLE 4

|  | Incoming claims | Intermediate claims | Outgoing claims |
|---|---|---|---|
| Account store |  | B1 |  |
| Custom claim transformation module |  | B2 | C1 |
| Built-in claim filtering module |  | B2 | C2 |
| Custom claim transformation module |  | B3 | C3 |

Table 4 illustrates an example of claim transformation steps when the identity provider and the resource provider directly trust the same STS (e.g. a non-federated system). Intermediate claims B1 are provided by an account store. A custom transformation module transforms the intermediate claim from B1 to B2 and adds outgoing claim C1. A built-in claim filtering module transforms the outgoing claims from C1 to C2. The custom transformation module transforms the intermediate claims from 82 to B3 and the outgoing claims from C2 to C3. The outgoing claims C3 are provided to an application associated with the claims. Intermediate claims B3 may be persisted in a cookie.

Below shows a data structure associated with a custom transformation module:

```
public enum ClaimTransformStage
{
    //
    // Transformation module is being called at the
    // pre-processing stage.
    PreProcessing = 0,
    //
    // Transformation module is being called at the
    // post-processing stage.
          PostProcessing,
     }
```

Below shows an example method for transforming claims:

```
public void    TransformClaims(
               IN OUT ClaimCollection incomingClaims,
               IN OUT ClaimCollection corporateClaims,
               IN OUT ClaimCollection outgoingClaims,
               IN ClaimTransformStage transformStage,
               IN string issuer,
               IN string target)
``` where
incomingClaims - The incoming claims.
corporateClaims - The corporate claims.
outgoingClaims - The outgoing claims.
transformStage - Indicates at which stage the custom claim transformation module is being called.
issuer - The URI of either the account store where the claims came from, or the URI of the trusted partner that the claims came from.
target - The URN of the destination target for whom the claims should be transformed.
If the claims came from a cookie then during the pre-processing stage the incomingClaims ClaimCollection will be empty and the corporateClaims ClaimCollection will be populated from the cookie.

An example of custom claim transformation module that can be built to support claim transformations not supported by an STS out of the box would be a module to support transforming claims that were in the form of one currency type into another currency type, for example US dollars to Japanese Yen. The module would be configured to only perform claim transformation when post-processing was indicated by the passed parameters. The module may be configured to look through all inbound claims and determine the currency claims. The module may then look at the claims for which the transformation is being performed and determine from policy the currency type that this resource expected. This information may be looked up in some policy specified for the module. With this information, the module determines the current exchange rates and applies the exchange from the inbound currency types to the currency type expected by the specified resource. The outbound claims would be populated with all the inbound claims but currency claims would be replaced with the new transformed currency types. The STS would then put the outbound claims into the token.

Figure 2:
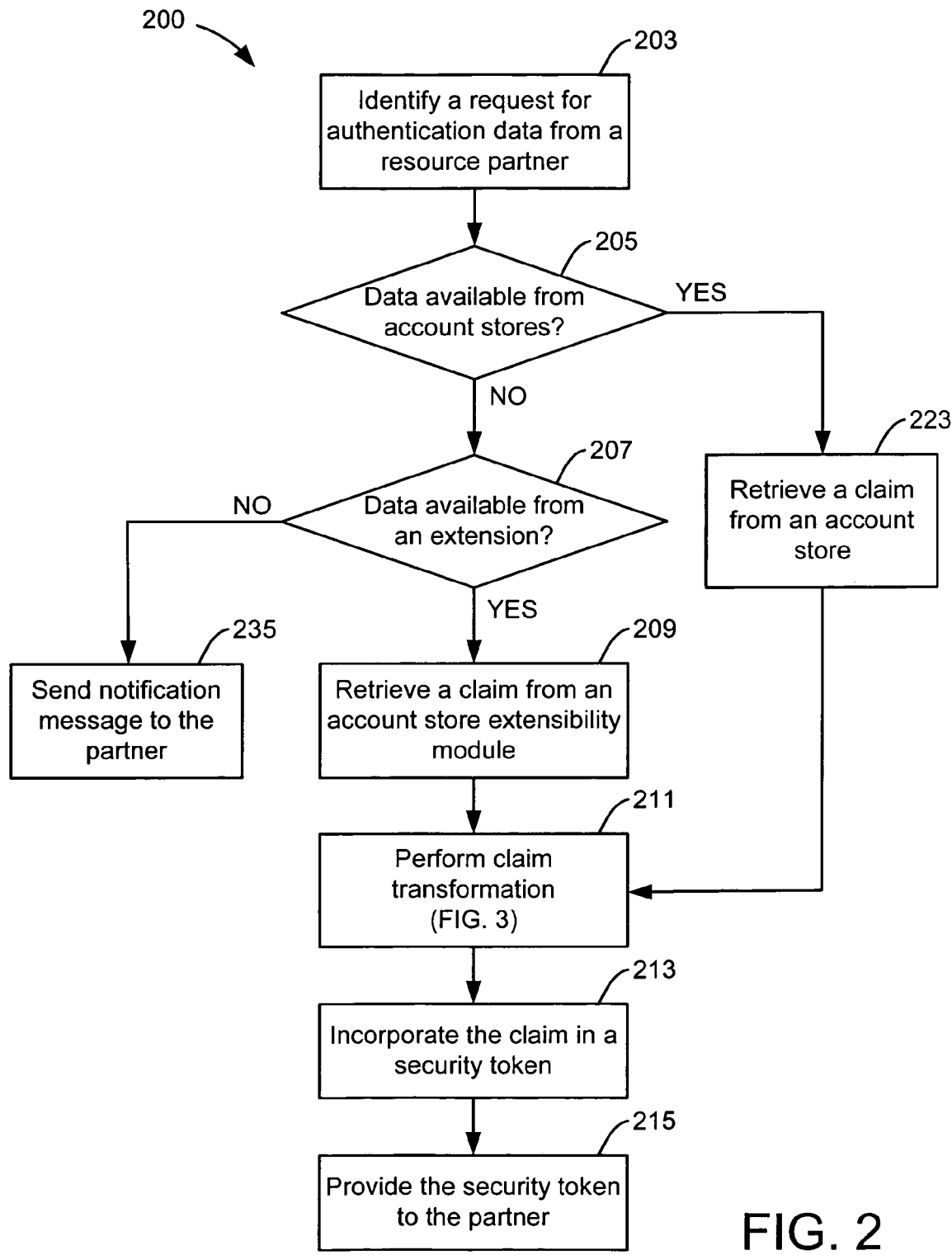
FIG. 2 shows an example process for providing security claims in a federated authentication system with extensibility points.

FIG. 2 shows an example process 200 for providing security claims in a federated authentication system with extensibility points. Process 200 may be implemented by an STS-IP to provide security claims to an STS-RP. At block 203, a request for authentication data from a resource partner is identified. At decision block 205, a determination is made whether the requested data is available at account stores that are explicitly recognized by the STS-IP. If so, process 200 moves to block 223 where a claim is retrieved from an account store that provides the data. Process 200 continues at block 211.

Returning to decision block 205, if the data is not available from the account stores, process 200 moves to decision block 207 where a determination is made whether data is available from an extension. If not, process 200 goes to block 235 where a notification message is sent to the partner that no authentication data is available for the requested account. If data is available from an extension, process 200 moves to block 209 where a claim is retrieved from an account store extensibility module.

At block 211, a transformation is performed on the retrieved claim. An example process for claim transformation will be discussed in conjunction with FIG. 3. Briefly stated, the retrieved claim is transformed from an intermediate format to a format recognized by the STS-RP of the resource partner. At block 213, the claim is incorporated into a security token. At block 215, the security token is provided to the resource partner.

Figure 3:
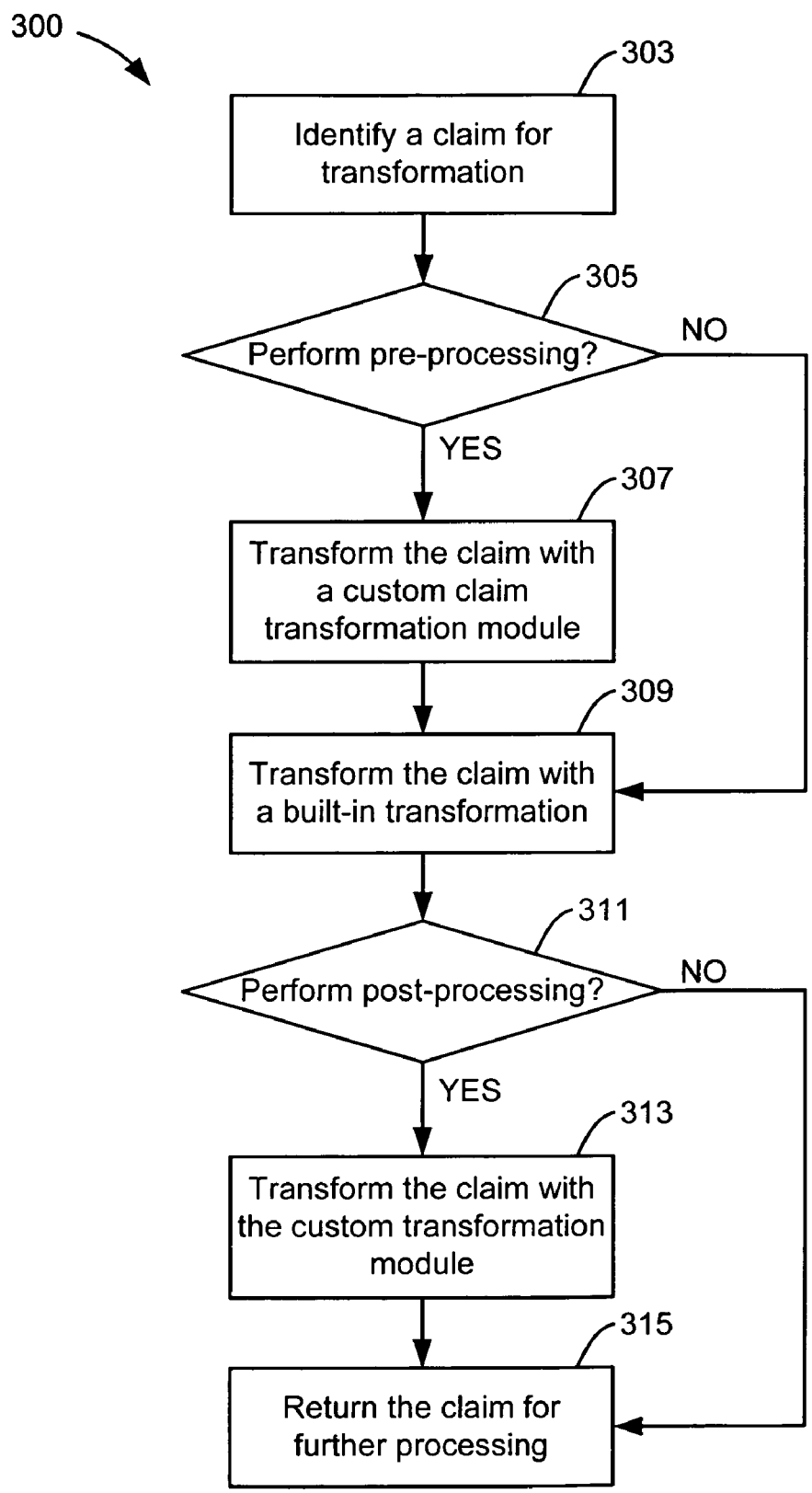
FIG. 3 shows an example process for transforming security claims by an STS-IP.

FIG. 3 shows an example process 300 for transforming security claims by an STS-IP. At block 303, a security claim for transformation is identified. At decision block 305, a determination is made whether to perform pre-processing on the security claims. Pre-processing is performed before any built-in transformation of the STS-IP. If a determination is made to not perform pre-processing, process 300 continues at block 309. If pre-processing is to be performed, process 300 goes to block 307 where the claim is transformed with one or more custom claim transformation modules. At block 309, the claim is then transformed with a built-in transformation module.

At decision block 311, a determination is made whether to perform post-processing on the security claims. Post-processing is performed after built-in transformation of the STS-IP. If a determination is made to not perform post-processing, process 300 continues at block 315. If post-processing is to be performed, process 300 goes to block 313 where the claim is transformed with one or more custom claim transformation modules. The custom claim transformation modules for post-processing may or may not be the same as the custom claim transformation modules for pre-processing. At block 315, the claim is returned for further processing. For example, the claim may be incorporated in a security token for sending to a STS-RP.

Figure 4:
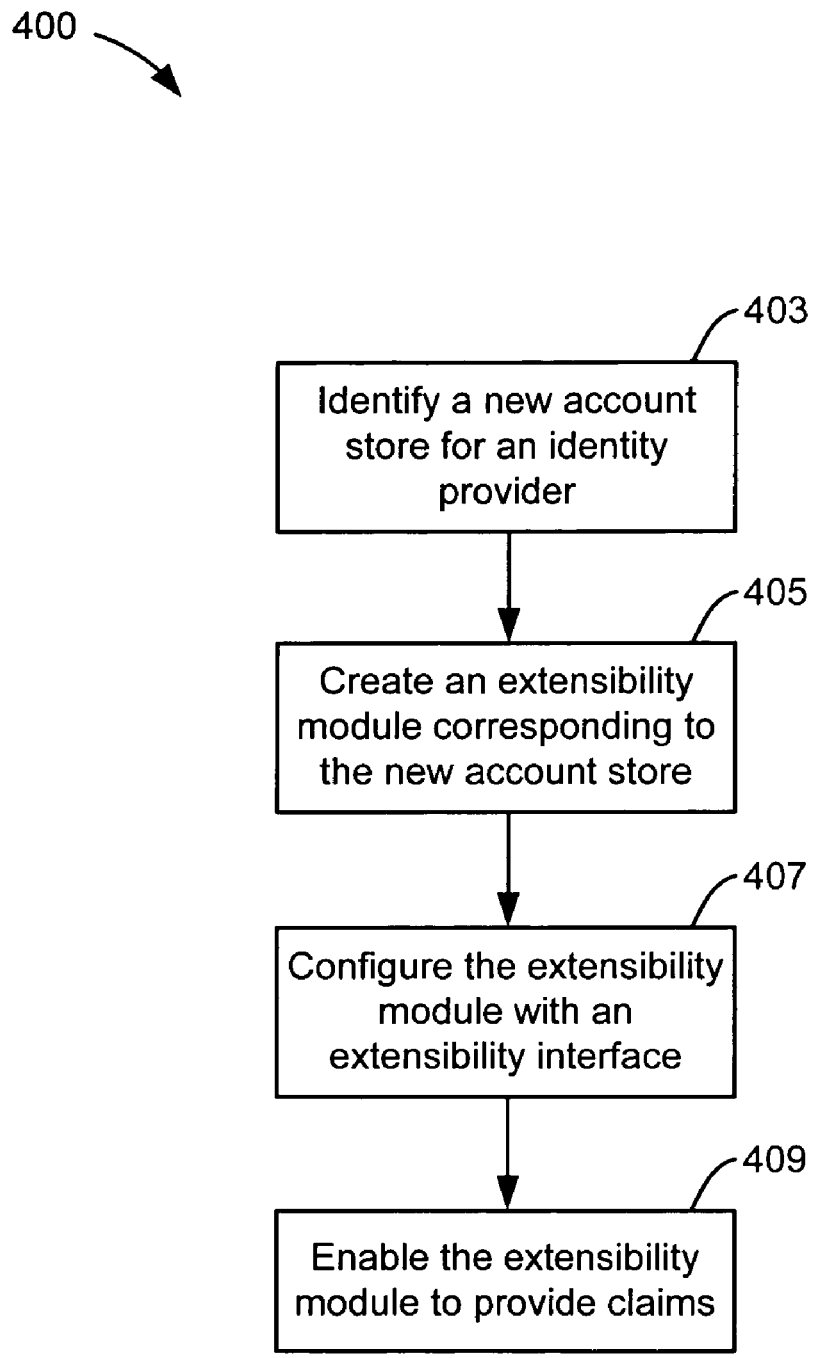
FIG. 4 shows an example process for extending a federated authentication system to include a new account store.

FIG. 4 shows an example process 400 for extending a federated authentication system to include a new account store. Process 400 may be implemented to add an account store that is not explicitly recognized by an STS-IP. At block 403, a new account store for an identity provider is identified. At block 405, an extensibility module corresponding to the new account store is created. The STS-IP typically provides an extensibility point for interacting with the STS-IP. At block 407, the extensibility module is configured with an extensibility interface for interacting with the STS-IP extensibility point. At block 409, the extensibility module is enabled to provide security claims for the STS-IP.

Figure 5:
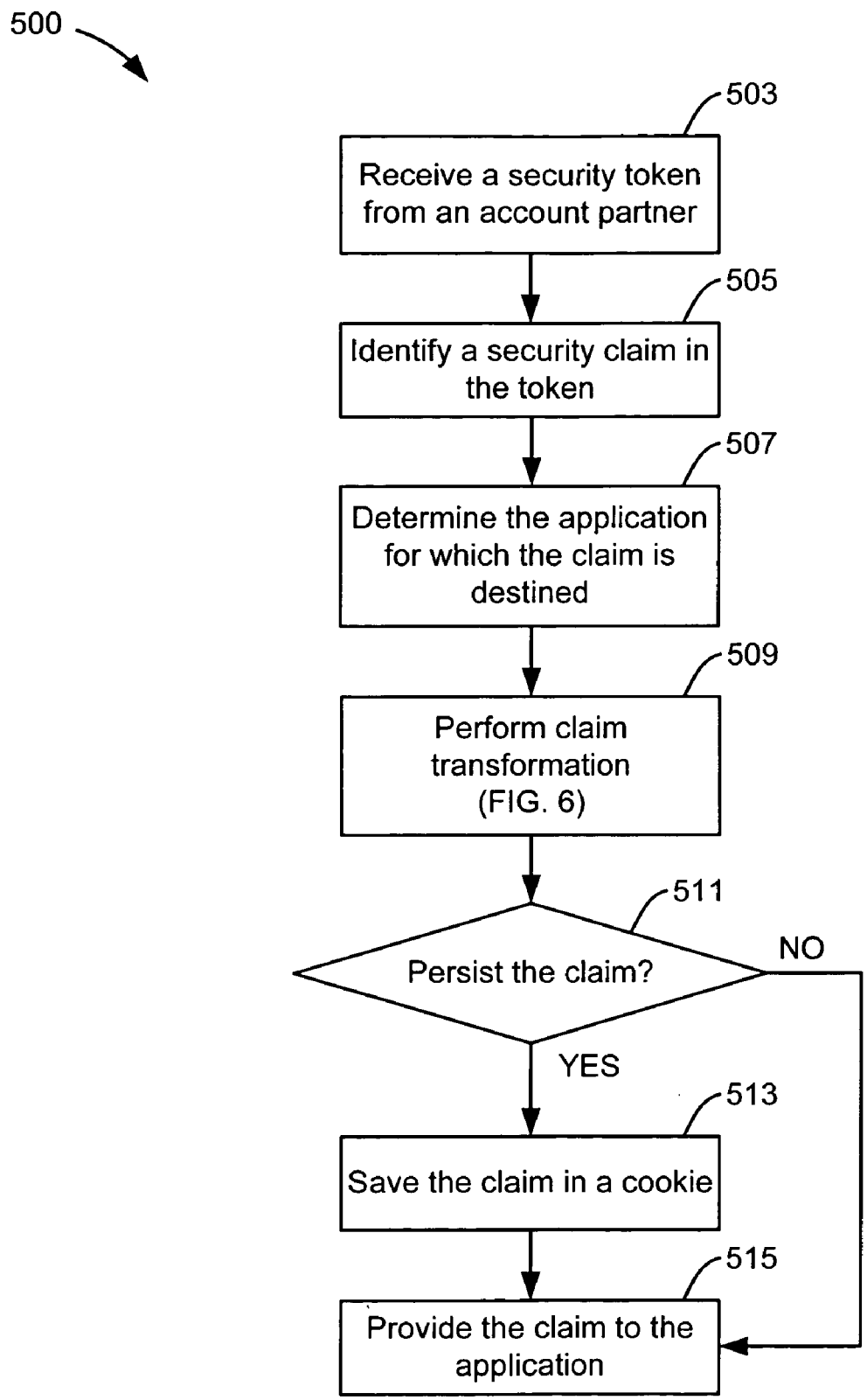
FIG. 5 shows an example process for providing security claims in a federated authentication system with extensibility points.

FIG. 5 shows an example process 500 for providing security claims in a federated authentication system with extensibility points. Process 500 may be implemented by an STS-RP to provide security claims to an application associated with a resource provider. At block 503, a security token is received from the STS-IP of an account partner. A security claim in the token is identified. At block 507, the application for which the claim is destined is determined. At block 509, transformation is performed on the claim. An example process for claim transformation will be discussed in conjunction with FIG. 6. Briefly stated, the claim is transformed from a federated format to an intermediate and then to a format recognized by the application.

At block 511, a determination is made whether to persist the claim. If not, process 500 moves to block 515. If the claim is to be persisted, process 500 goes to block 513 where the claim in the intermediate format is saved in a cookie. At block 515, the outgoing claim is provided to the application.

Figure 6:
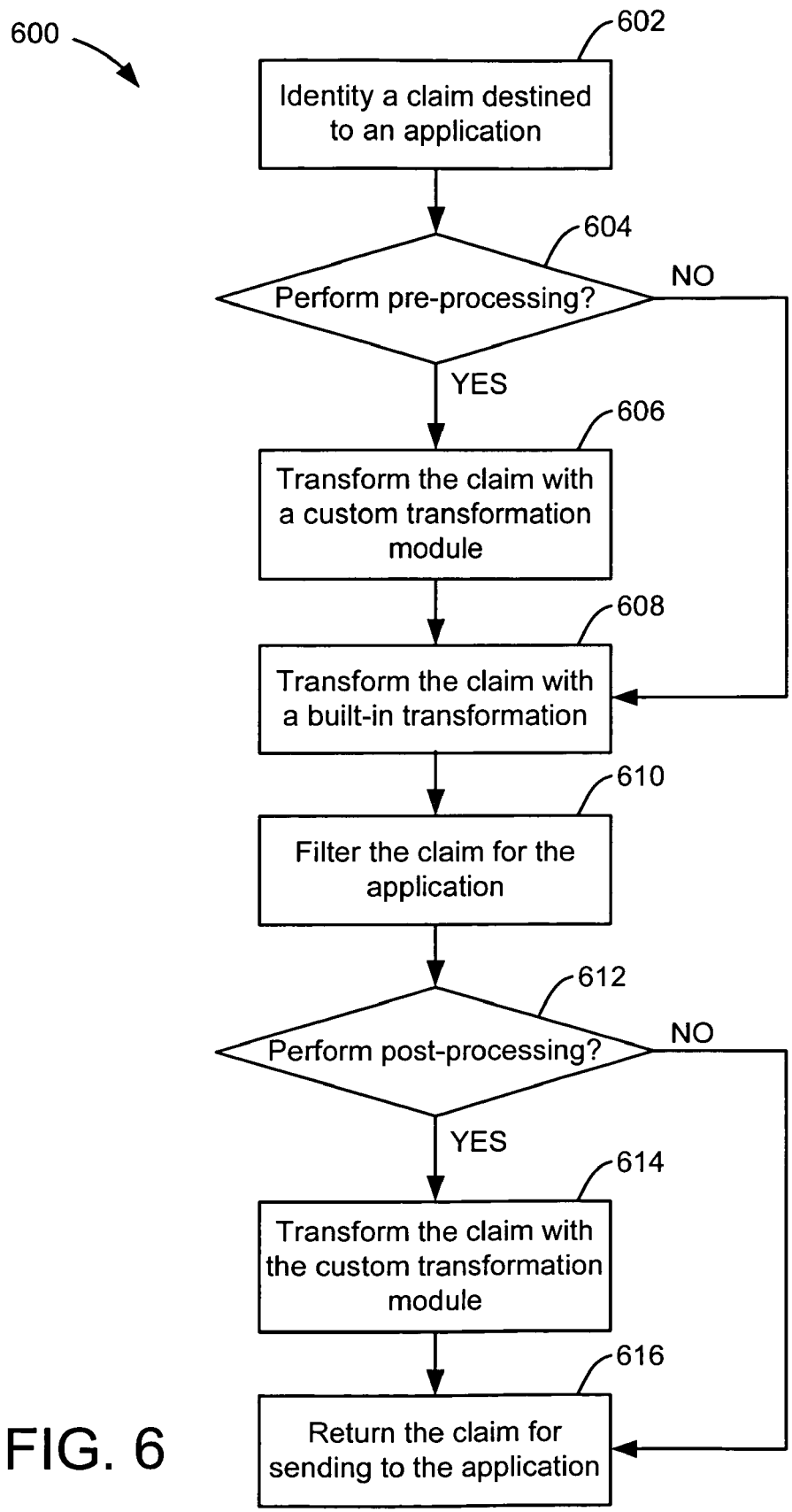
FIG. 6 shows an example process for transforming security claims by an STS-RP.

FIG. 6 shows an example process 600 for transforming security claims by an STS-RP. At block 602, a claim destined for an application is identified. At decision block 604, a determination is made whether to perform pre-processing on the claim. If not, process 600 moves to block 608. If pre-processing is to be performed, process 600 goes to block 606 where the claim is transformed with a custom transformation module. At block 608, the claim is transformed with a built-in transformation. At block 610, the claim is filtered for the application.

At decision block 612, a determination is made whether to perform post-processing on the security claims. If a determination is made to not perform post-processing, process 600 continues at block 616. If post-processing is to be performed, process 600 goes to block 614 where the claim is transformed with one or more custom claim transformation modules. At block 616, the claim is returned for sending to the application.

Figure 7:
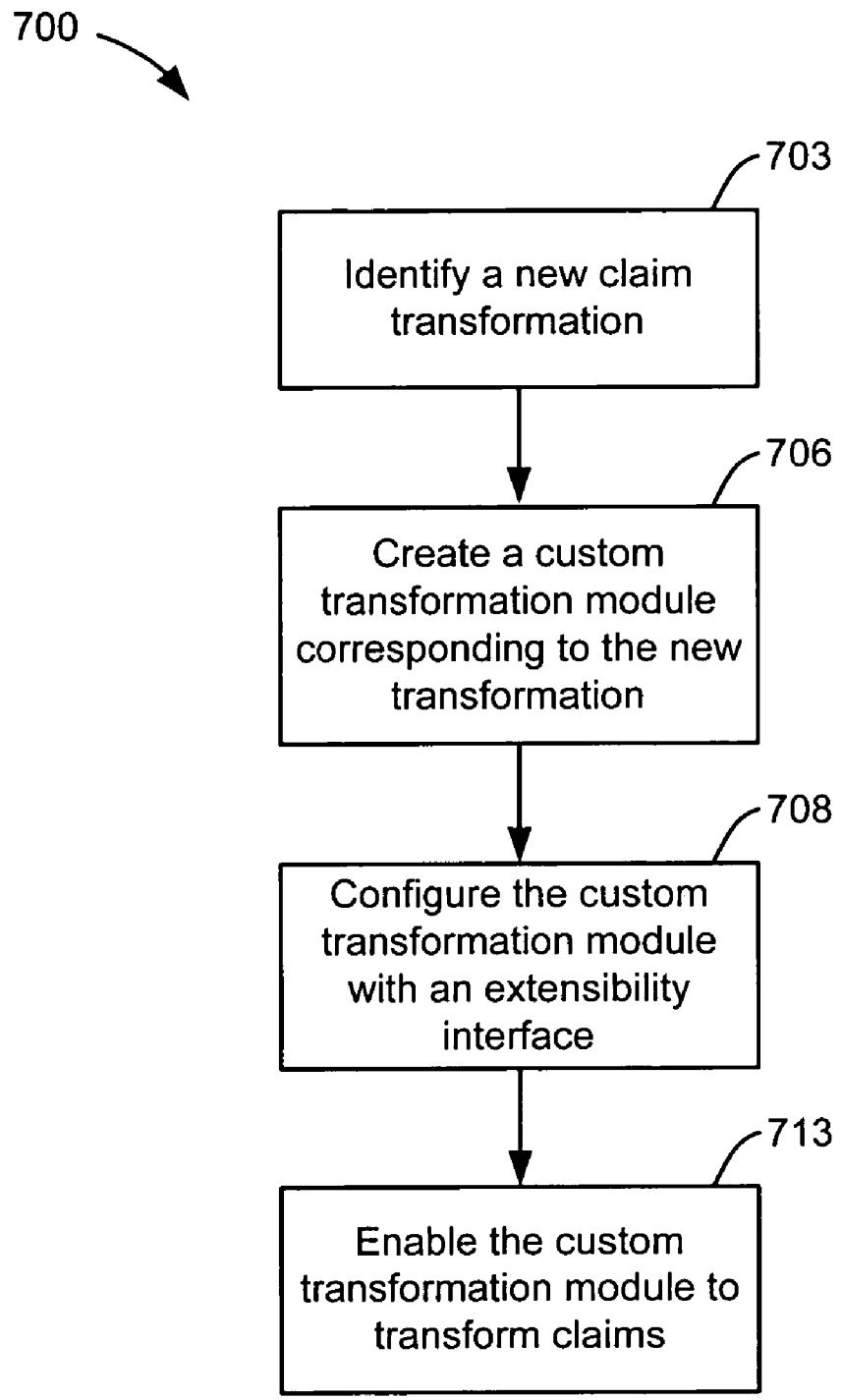
FIG. 7 shows an example process for extending a federated authentication system to include a new claim transformation.

FIG. 7 shows an example process 700 for extending a federated authentication system to include a new claim transformation. Process 400 may be implemented to add a custom transformation module to an STS-IP or STS-RP. At block 703, a new claim transformation is identified. At block 706, a custom transformation module corresponding to the new transformation is created. At block 708, the custom transformation module is configured with an extensibility interface for interacting with extensibility points provided by the STS. At block 713, the custom transformation module is enabled to transform claims for the STS.

Figure 8:
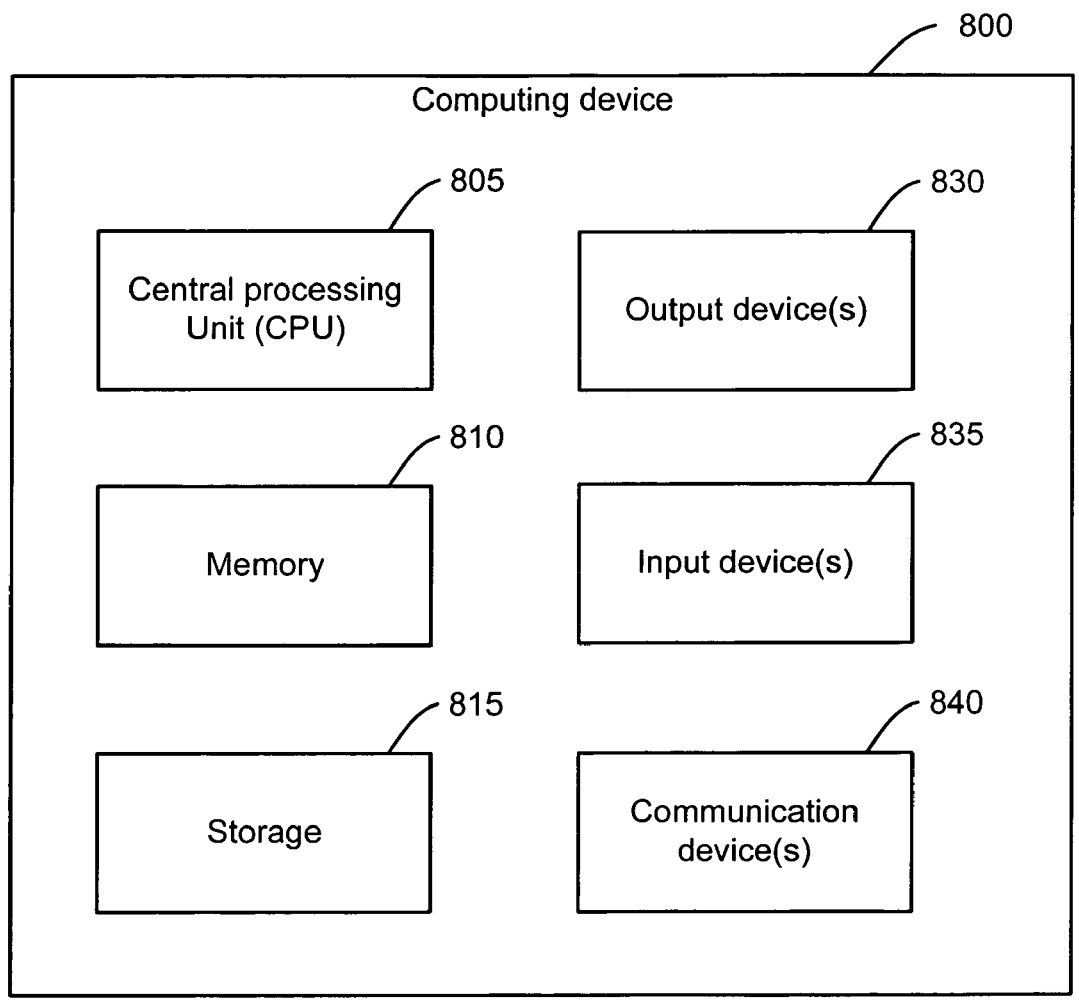
FIG. 8 shows an exemplary computer device for implementing the described systems and methods.

FIG. 8 shows an example computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. At least one computer-readable device encoded with computer-executable components comprising:
an account store of an identity provider, wherein the account store is configured to maintain data associated with accounts, and wherein the data comprises security information associated with users associated with the accounts, and wherein the security information is organized in the form of security claims, and wherein the account store is further configured to provide the security claims in an intermediate format, and wherein the identity provider is configured to incorporate a requested security claim of the security claims into a security token and to provide the security token comprising the requested security claim to a resource provider of a plurality of resource providers in response to a request from the resource provider;

a security token service (STS) of the resource provider, wherein the STS is configured to retrieve the security token comprising the requested security claim provided by the identity provider, and wherein the STS includes built-in transformation modules configured to transform the requested security claim from the intermediate format to a format recognized by the resource provider, and wherein the STS further includes extensibility points configured for interfacing with custom claim transformation modules that are not built-in to the STS, and wherein the STS further includes other extensibility points configured for interfacing with other account stores that are not built-in to the STS; and the extensibility points configured for interfacing with the custom claim transformation modules which are each configured to perform at least one custom claim transformation of at least one of the security claims from the intermediate format to at least one of the formats recognized by the plurality of resource providers, wherein each custom claim transformation module is further configured to interact with the STS through at least one of the extensibility points.

2. The at least one computer-readable device of claim 1, wherein the custom claim transformation modules are further configured to perform the at least one custom claim transformation in sequence on at least one of the security claims.

3. The at least one computer-readable device of claim 1, wherein the custom claim transformation modules are further configured to perform the at least one custom claim transformation in conjunction with the built-in transformations.

4. The at least one computer-readable device of claim 3, wherein the custom claim transformation modules are configured to perform the at least one custom claim transformation before or after the built-in transformations.

5. The at least one computer-readable device of claim 1, wherein the at least one custom claim transformation includes deleting at least one of the security claims.

6. The at least one computer-readable device of claim 1, further comprising account store extensibility modules associated with other account stores that are not explicitly recognized by the STS, the account store extensibility modules further configured to interact with the STS through the other extensibility points.

7. The at least one computer-readable device of claim 6, wherein the account store extensibility modules include a SQL module for supporting a SQL server based account store, wherein the SQL module is configured to pass account credentials and to query a database for a record associated with the account, and wherein the SQL module is further configured to verify a password with the record and to provide a claim populated by data in the record to the STS.

8. The at least one computer-readable device of claim 6, wherein the account store extensibility modules include a fingerprint module configured to authenticate an account using a fingerprint associated with the account and to provide a claim populated by data associated with the account if the account is authenticated by the fingerprint.

9. A computing device configured to read the at least one computer-readable device and to implement the computer-executable components of claim 1.

10. A system comprising:
a computing device; and
an account store of an identity provider configured to operate on the computing device, wherein the account store is configured to maintain data associated with accounts, and wherein the data comprises security information associated with users associated with the accounts, and wherein the security information is organized in the form of security claims, and wherein the account store is further configured to provide the security claims in an intermediate format, and wherein the identity provider is configured to incorporate a requested security claim of the security claims into a security token and to provide the security token comprising the requested security claim to a resource provider of a plurality of resource providers in response to a request from the resource provider, and wherein the resource provider includes a security token service (STS) configured to retrieve the security token comprising the requested security claim provided by the identity provider, wherein the STS includes built-in transformation modules configured to transform the requested security claim from the intermediate format to a format recognized by the resource provider, and wherein the STS further includes extensibility points configured for interfacing with custom claim transformation modules that are not built-in to the STS, and wherein the STS further includes other extensibility points configured for interfacing with other account stores that are not built-in recognized by the STS and wherein the custom claim transformation modules configured to perform at least one custom transformation of at least one of the security claims from the intermediate format to at least one of the different formats, wherein each custom claim transformation module is further configured to interact with the STS through at least one of the extensibility points.

11. The system of claim 10, wherein the custom claim transformation modules are configured to perform in sequence on at least one of the security claims.

12. The system of claim 11, wherein the custom claim transformation modules are configured to perform the at least one custom transformation before or after built-in transformations.

13. The system of claim 10, wherein the custom claim transformation modules are configured to perform the at least one custom transformation in conjunction with built-in transformations.

14. The system of claim 10, wherein the custom claim transformation modules are configured to perform transformations on a security claim retrieved from a cookie.

15. The system of claim 10, wherein the at least one custom transformation includes deleting at least one of the security claims.

16. A federated authentication method comprising:
maintaining, by a computing device in an account store, data associated with accounts, wherein the data comprises security information associated with users associated with the accounts, and wherein the security information is organized in the form of security claims, and wherein the account store is further configured to provide the security claims in an intermediate format, and wherein the identity provider is configured to incorporate a requested security claim of the security claims into a security token and to provide the security token comprising the requested security claim to a resource provider of a plurality of resource providers in response to a request from the resource provider, and wherein the resource provide includes a security token service (STS) configured to retrieve the security token comprising the requested security claim provided by the identity provider, wherein the STS includes built-in transformation modules configured to transform the requested security claim from the intermediate format to a format recognized by the resource provider, and wherein the STS further includes extensibility points configured for interfacing with custom claim transformation modules that are not built-in to the STS, and wherein the STS further includes other extensibility points configured for interfacing to interact with other account stores that are not built-in recognized by the STS and wherein the custom claim transformation modules configured to perform at least one custom transformation of at least one of the security claims from the intermediate format to at least one of the different formats, wherein each custom claim transformation module is further configured to interact with the STS through at least one of the extensibility points.

17. The federated authentication method of claim 16, wherein the custom claim transformation modules are further configured to perform the custom transformations in conjunction with the built-in transformations.

18. The federated authentication system method of claim 16, wherein the custom claim transformation modules are further configured to perform the custom transformations in sequence.

* * * * *